United States Patent
Miyahara et al.

(10) Patent No.: US 8,336,414 B2
(45) Date of Patent: Dec. 25, 2012

(54) ROLLER SCREW AND METHOD OF DESIGNING UNLOADED ROLLER RETURN PATH THEREOF

(75) Inventors: Soshi Miyahara, Tokyo (JP); Masahiko Yoshino, Tokyo (JP); Takashi Sakuyama, Tokyo (JP)

(73) Assignee: THK Co., Ltd., Tokyo (JP)

( * ) Notice: Subject to any disclaimer, the term of this patent is extended or adjusted under 35 U.S.C. 154(b) by 1093 days.

(21) Appl. No.: 12/298,849

(22) PCT Filed: Apr. 26, 2007

(86) PCT No.: PCT/JP2007/059116
§ 371 (c)(1),
(2), (4) Date: Oct. 28, 2008

(87) PCT Pub. No.: WO2007/126025
PCT Pub. Date: Nov. 8, 2007

(65) Prior Publication Data
US 2009/0070078 A1  Mar. 12, 2009

(30) Foreign Application Priority Data
Apr. 28, 2006 (JP) ................... 2006-126613

(51) Int. Cl.
F16H 25/22 (2006.01)
(52) U.S. Cl. .................. 74/424.86; 74/424.91
(58) Field of Classification Search ........... 384/44; 74/424.86, 424.91–421.93
See application file for complete search history.

(56) References Cited

U.S. PATENT DOCUMENTS

| 2,259,325 A | * | 10/1941 | Robinson | 384/569 |
| 3,192,791 A | | 7/1965 | Greby | |
| 3,971,264 A | | 7/1976 | Detraz et al. | |
| 3,977,736 A | * | 8/1976 | Pitner | 384/44 |
| 5,529,402 A | * | 6/1996 | Murphy | 384/564 |
| 5,902,022 A | * | 5/1999 | Shattuck et al. | 384/569 |

FOREIGN PATENT DOCUMENTS

| EP | 0208017 A2 | 1/1987 |
| EP | 1666768 A1 | 6/2006 |
| EP | 1801458 A1 | 6/2007 |
| GB | 1085086 A | 9/1967 |
| JP | 50-31257 A | 3/1975 |

(Continued)

OTHER PUBLICATIONS

Chinese Office Action dated Mar. 31, 2010, issued in corresponding Chinese Patent Application No. 200780015452.5.

(Continued)

*Primary Examiner* — William C Joyce
*Assistant Examiner* — Terence Boes
(74) *Attorney, Agent, or Firm* — Westerman, Hattori, Daniels & Adrian, LLP

(57) ABSTRACT

Provided is a roller screw having an unloaded roller return path of new shape capable of moving rollers smoothly. The roller circulation path of the roller screw has the unloaded roller return path and a loaded roller rolling path. The unloaded roller return path 10 is twisted so that while each roller 4 moves in the unloaded roller return path 10 its central axis is inclined. In a cross sectional shape of the twisted part of the unloaded roller return path 10, each of paired side surface corresponding parts 25c and 25d facing respective side surfaces of the roller 4 is convex toward the inside of the unloaded roller return path 10.

6 Claims, 16 Drawing Sheets

FOREIGN PATENT DOCUMENTS

| | | |
|---|---|---|
| JP | 3-20753 U | 2/1991 |
| JP | 11-210858 A | 8/1999 |
| WO | 2005/026581 A1 | 3/2005 |
| WO | 2006/028124 A1 | 3/2006 |

OTHER PUBLICATIONS

International Search Report of PCT/JP2007/059116, date of mailing Aug. 14, 2007.

European Search Report dated Dec. 28, 2009, issued in corresponding European Patent Application No. 07742551.0.

Translation of the Written Opinion of the International Searching Authority (Form PCT/ISA/237) of International Application No. PCT/JP2007/059116.

* cited by examiner (A)　　　　　　　(B)

RELATED ART

RELATED ART

ROLLER SCREW AND METHOD OF DESIGNING UNLOADED ROLLER RETURN PATH THEREOF

TECHNICAL FIELD

The present invention relates to a roller screw having a screw shaft, a nut and rollers rollably arranged therebetween, and a method of designing an unloaded roller return path thereof.

BACKGROUND ART

A ball screw having a screw shaft, a nut and balls rollably arranged therebetween is greatly used in various fields such as positioning mechanisms of machine tools and robots, feeding mechanisms, steering gears of automobiles and the like as the ball screw enables reduction of a coefficient of friction in rotating the screw shaft relative to the nut.

Recently, in order to increase allowable loads, there is developed a roller screw using rollers instead of the balls. The roller screw has a screw shaft having an outer peripheral surface with s spiral roller rolling part formed thereon, a nut having an inner peripheral surface with a spiral loaded roller rolling part formed thereon facing the roller rolling part of the screw shaft, and a plurality of rollers rollably arranged between the roller rolling part of the screw shaft and the loaded roller rolling part of the nut. As the nut rotates relative to the screw shaft, the rollers roll between the screw shaft and the nut. Once each roller has rolled up to one end of the loaded roller rolling part of the nut, the roller is lead into an unloaded roller return path provided in the nut. Then, after passing through the unloaded roller return path, the roller is returned to the other end of the loaded roller rolling part.

Balls can roll in all directions. Meanwhile, rollers can roll only in one direction. In order to move the rollers smoothly from the unloaded roller return path to a loaded roller rolling path between the roller rolling part of the screw shaft and the loaded roller rolling part of the nut, there is a need to match an attitude of each roller inside the unloaded roller return path with an attitude of the roller inside the loaded roller rolling path at a connection part of the loaded roller rolling path and the unloaded roller return path. To meet this need, as shown in FIGS. 18 and 19, a midpoint of an unloaded roller return path 51 is twisted so that an attitude of each roller 52 is changed when the roller 52 moves in the unloaded roller return path 51 (the central axis of the roller 52 is inclined) (see, for example, the patent document 1). Besides, the cross sectional shape of the unloaded roller return path 51 is formed to be a quadrangle similar to a cross sectional shape of the roller 52 taken along the central axis of the roller 52.

[Patent Document 1] Japanese Patent Laid-open Publication No. 11-210858

DISCLOSURE OF INVENTION

Problems to be Solved by the Invention

In order to achieve an unloaded roller return path having a quadrangular cross section similar to the cross section of a roller 53, as shown in FIG. 20, the inventors designed the unloaded roller return path by sweeping of the cross section of the roller 53. Specifically, they designed the moving track of the central axis of the roller 53 in the unloaded roller return path to be a band-like surface shape and twisted the moving track 54 of band-like surface shape. Then, they parallel-moved the moving track 54 of band-like surface shape by a distance obtained by adding a clearance to the roller diameter, and designed a wall surface 55 of the unloaded roller return path. First, they thought that rollers 53 could be held in such a little-clearance unloaded roller return path.

However, when the unloaded roller return path was formed having a quadrangular cross section similar to the cross section of each roller 53 taken along the central axis thereof, the roller 53 interfered with the wall surface 55 of the unloaded roller return path. They have found that this interference results from bulges 57, 58 (outwardly curved surface) in the vicinity of an outline 56 of the cylindrical roller 53. When the unloaded roller return path is designed by sweeping of the cross section of the roller 53, it is made only in consideration of one cross section of the roller 53 including the outline 56 of the roller 53, and not of the bulges in the vicinity of the outline 56 of the roller 53. If the cross sectional shape of the unloaded roller return path is enlarged similarly in order to eliminate the interference, then, play of the roller 53 becomes increased. Such play of the roller may invite circulation failure of the roller.

Although the roller screw is developed, it has not manufactured yet. When the roller screw is manufactured experimentally, it is found that smooth movement of the rollers is extremely difficult. The above-described conventional designing method of the unloaded roller return path is regarded as one of the factors that prevent smooth circulation of the rollers.

Then, the present invention has an object to provide a roller screw having an unloaded roller return path of new shape capable of moving rollers smoothly and also provide a new method of designing an unloaded roller return path of the roller screw.

Means for Solving the Problem

The present invention will now be described as follows.

In order to solve the above-mentioned problems, the invention is a roller screw comprising: a screw shaft having an outer peripheral surface with a roller rolling part spirally formed thereon; a nut having an inner peripheral surface with a loaded roller rolling part spirally formed thereon facing the roller rolling part, and having an unloaded roller return path connecting one end of the loaded roller rolling part with an opposite end thereof; and a plurality of rollers parallel-arranged in a roller circulation path having the unloaded roller return path and a loaded roller rolling path between the roller rolling part and the loaded roller rolling part in such a manner that axis lines of adjacent two of the rollers are held substantially in parallel with each other, the unloaded roller return path having, in a longitudinal direction thereof, at least a twisted part which is twisted in such a manner that a central axis of each of the rollers is inclined when the roller moves in the unloaded roller return path, and the twisted part of the unloaded roller return path having a cross section of which each of paired side surface corresponding parts facing respective side surfaces of the roller is convex toward an inside of the unloaded roller return path.

The invention is a roller screw comprising: a screw shaft having an outer peripheral surface with a roller rolling part spirally formed thereon; a nut having an inner peripheral surface with a loaded roller rolling part spirally formed thereon facing the roller rolling part, and having an unloaded roller return path connecting one end of the loaded roller rolling part with an opposite end thereof; and a plurality of rollers parallel-arranged in a roller circulation path having the unloaded roller return path and a loaded roller rolling path between the roller rolling part and the loaded roller rolling part in such a manner that axis lines of adjacent two of the rollers are held substantially in parallel with each other, the unloaded roller return path having, in a longitudinal direction thereof, at least a twisted part which is twisted in such a manner that a central axis of each of the rollers is inclined when the roller moves in the unloaded roller return path, and the twisted part of the unloaded roller return path having a cross section of which each of paired end surface corresponding parts facing respective end surfaces of the roller is convex toward an outside of the unloaded roller return path.

The invention is a roller screw comprising: a screw shaft having an outer peripheral surface with a roller rolling part spirally formed thereon; a nut having an inner peripheral surface with a loaded roller rolling part spirally formed thereon facing the roller rolling part, and having an unloaded roller return path connecting one end of the loaded roller rolling part with an opposite end thereof; and a plurality of rollers parallel-arranged in a roller circulation path having the unloaded roller return path and a loaded roller rolling path between the roller rolling part and the loaded roller rolling part in such a manner that axis lines of adjacent two of the rollers are held substantially in parallel with each other, the unloaded roller return path having, in a longitudinal direction thereof, at least a twisted part which is twisted in such a manner that a central axis of each of the rollers is inclined when the roller moves in the unloaded roller return path, and the twisted part of the unloaded roller return path having a cross section of which each of paired side surface corresponding parts facing respective side surfaces of the roller is convex toward an inside of the unloaded roller return path and each of paired end surface corresponding parts facing respective end surfaces of the roller is convex toward an outside of the unloaded roller return path.

In the roller screw, a cross sectional shape of each end part of the unloaded roller return path connected to the loaded roller rolling path is a quadrangle similar to a cross sectional shape of the roller taken along the central axis thereof.

In the roller screw, the each end part of the unloaded roller return path acts to move the roller along a straight raceway with an attitude of the roller kept fixed.

In the roller screw, the unloaded roller return path has a straight path which acts to move the roller along a straight raceway and a direction change path which acts to move the roller along a curved raceway, the straight path of the unloaded roller return path is twisted in such a manner that the central axis of the roller is inclined when the roller moves in the straight path, and the direction change path of the unloaded roller return path is not twisted so that the central axis of the roller is not inclined when the roller moves in the direction change path.

The invention of claim 7 is a method of designing an unloaded roller return path of a roller screw having: a screw shaft having an outer peripheral surface with a roller rolling part spirally formed thereon; a nut having an inner peripheral surface with a loaded roller rolling part spirally formed thereon facing the roller rolling part and having the unloaded roller return path connecting one end of the loaded roller rolling part with an opposite end thereof; and a plurality of rollers parallel-arranged in a roller circulation path having the unloaded roller return path and a loaded roller rolling path between the roller rolling part and the loaded roller rolling part, the method comprising: a line designing step of designing a line-shaped moving track of a center point of each of the rollers in the unloaded roller return path; a surface designing step of designing a band-like surface shaped moving track of the center point of the roller by moving a central axis of the roller along the line-shaped moving track, and of twisting at least a longitudinal part of the band-like surface shaped moving track; and an unloaded roller return path designing step of designing the unloaded roller return path by moving the roller along the band-like surface shaped moving track.

In the roller screw, the unloaded roller return path designing step uses a virtual roller having a diameter and a height both slightly larger than a diameter and a height of a roller used actually.

Effects of the Invention

According to the invention, the cross sectional shape of the unloaded roller return path is not a quadrangle similar to the cross sectional shape of the roller taken along the central axis thereof but a cross sectional shape of the moving track of the roller. This makes it possible to provide the unloaded roller return path with minimum clearance that enables movement of the rollers.

According to the invention, the cross sectional shape of each end part of the unloaded roller return path is made close to the cross sectional shape of the loaded roller rolling path. This makes it possible to move the rollers smoothly from the unloaded roller return path to the loaded roller rolling path.

According to the invention, it is possible to move the rollers smoothly from the unloaded roller return path to the loaded roller rolling path.

According to the invention, the direction change path for moving the rollers along the curved raceway is not twisted. This makes it possible to prevent the rollers from being inclined to move unsmoothly in the direction change path.

According to the invention, the cross sectional shape of the unloaded roller return path is not a quadrangle similar to the cross sectional shape of the roller taken along the central axis thereof but a cross sectional shape of the moving track of the roller.

BRIEF DESCRIPTION OF REFERENCES

Figure 1:
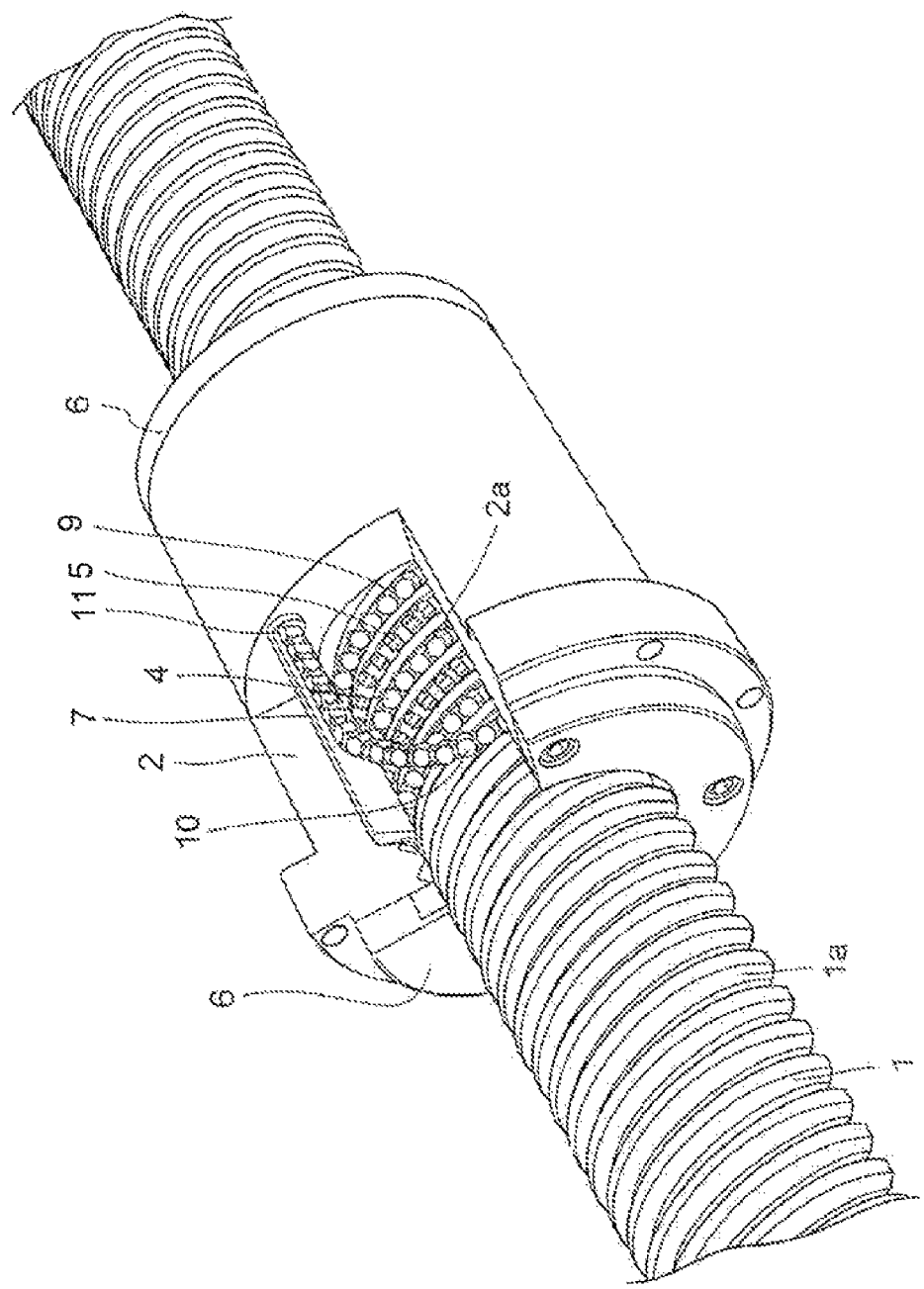
FIG. 1 is a perspective view of a roller screw according to a first embodiment of the present invention.

1a . . . roller rolling groove (roller rolling part)
1 . . . screw shaft
2, 36 . . . nut
2a, 36a . . . loaded roller rolling groove (loaded roller rolling part)
4 . . . roller
7 . . . straight path component (circulation member)
8 . . . direction change path component (circulation member)
9 . . . loaded roller rolling path
10, 32 . . . unloaded roller return path
10a, 32a . . . straight path
10b, 32b . . . direction change path
13, 13a, 13b . . . central axis
16, 17, 18 . . . moving track of the line shape
20 . . . moving track of the surface shape
21 . . . virtual roller
24 . . . cross sectional shape of the unloaded roller return path
25a, 25b . . . end surface corresponding part
25c, 25d . . . side surface corresponding part
33 . . . return pipe (circulation member)
38, 39, 40 . . . moving track of the line shape

BEST MODES FOR CARRYING OUT THE INVENTION

Figure 2:
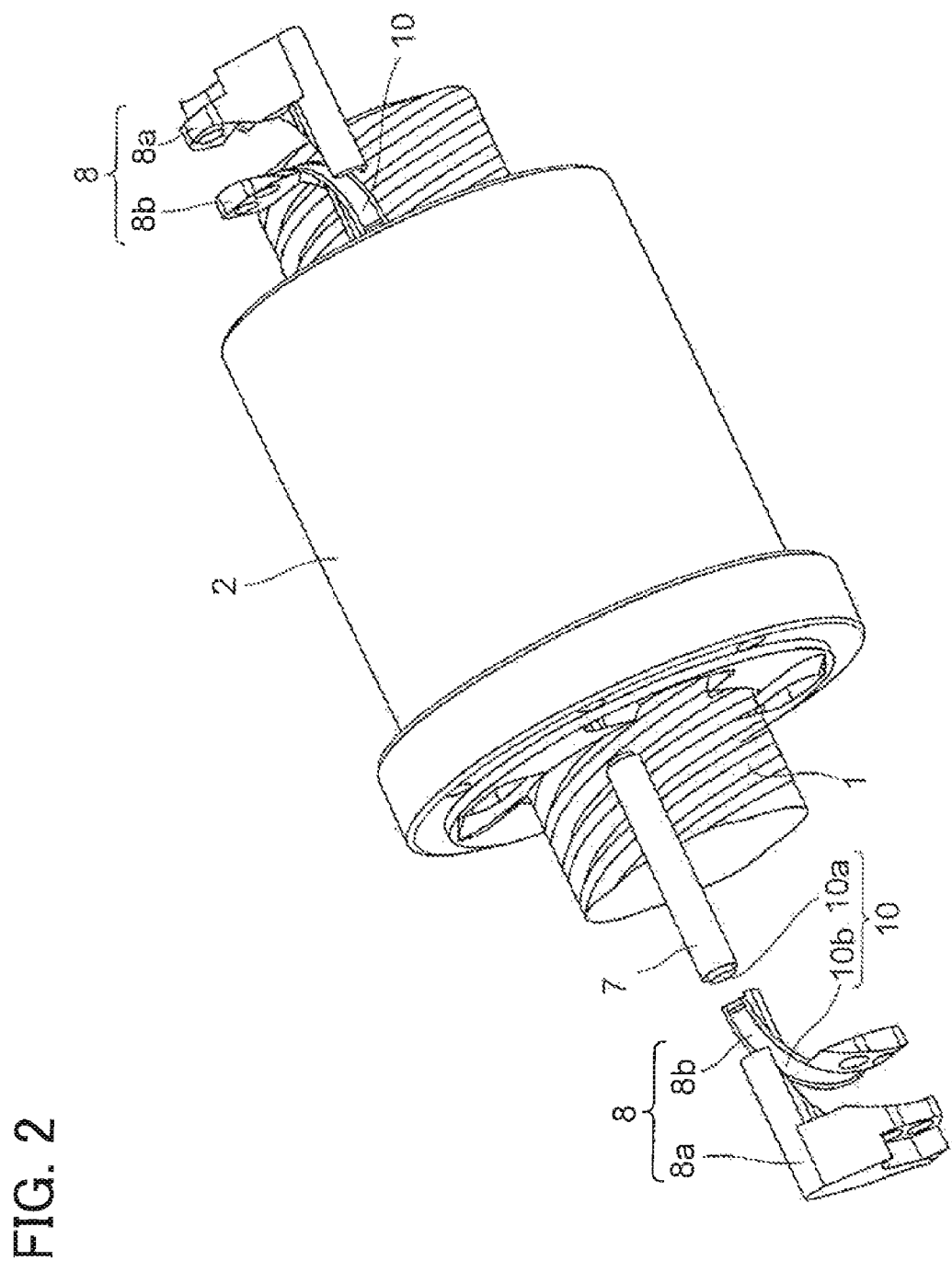
FIG. 2 is an exploded perspective view of the above-mentioned roller screw.

With reference to the attached drawings, embodiments of the present invention will be described in detail below. FIGS. 1 and 2 illustrate a roller screw according to one embodiment of the present invention.

FIG. 1 is a perspective view of the roller screw. The roller screw has a screw shaft 1 having an outer peripheral surface with a spiral roller rolling groove 1a formed thereon as a roller rolling part; and a nut 2 having an inner peripheral surface with a spiral loaded roller rolling groove 2a formed thereon as a loaded roller rolling part and facing the roller rolling groove 1a. A plurality of rollers 4 is arranged in a loaded roller rolling path between the roller rolling groove 1a of the screw shaft 1 and the loaded roller rolling groove 2a of the nut 2. Between the rollers 4, a retainer 5 is interposed to prevent contact of the rollers 4. To each axial end of the nut 2, a seal member 6 is attached so as to prevent any foreign matters attached to the surface of the screw shaft 1 from entering the inside of the nut 2 and also to prevent leakage of lubricant from the inside of the nut 2.

As illustrated in FIG. 2, the nut 2 has circulation members 7 and 8 mounted thereon. In the circulation members 7 and 8, an unloaded roller return path 10 is formed connecting one end of the loaded roller rolling groove 2a of the nut 2 to the opposite end. When the nut 2 is rotated relative to the screw shaft 1, the plural rollers 4 roll in the loaded roller rolling path 9 between the roller rolling groove 1a and the loaded roller rolling groove 2a. After each roller 4 has rolled up to an end of the loaded roller rolling path 9, the roller 4 passes through the unloaded roller return path 10 of the circulation members 7 and 8 and then is returned several turns back to the other end of the loaded roller rolling path 9.

The circulation members 7 and 8 include a straight path component 7 and a pair of direction change path components 8 provided at the respective ends of the straight path component 7. In the nut 2, a through hole 11 is formed in parallel with the axis line of the screw shaft 1, and the pipe-shaped straight path component 7 is inserted in this through hole 11. In the straight path component 7, there is formed a straight path 10a for moving the rollers along the straight raceway. The straight path 10a extends straightly in parallel with the axis line of the screw shaft 1.

The direction change path component 8 is attached to each axial end surface of the nut 2. In the direction change path component 8, there is formed a direction change path 10b moving the rollers along the circular arc-shaped raceway, for example. The direction change path component 8 is composed of an outer-side component 8a and an inner-side component 8b of the arc-shaped raceway. These outer-side component 8a and inner-side component 8b of the direction change path component 8 have respective flange portions. The outer-side component 8a and inner-side component 8b of the direction change path component 8 are assembled, positioned on the end surface of the nut 2 and have their flange portions secured to the end surface of the nut 2 by fixing means such as bolts. Both ends of the straight path component 7 are fit into the respective direction change path components 8. Accordingly, the straight path component 7 is also secured to the nut 2 by securing the direction change path components 8 to the nut 2.

Figure 3:
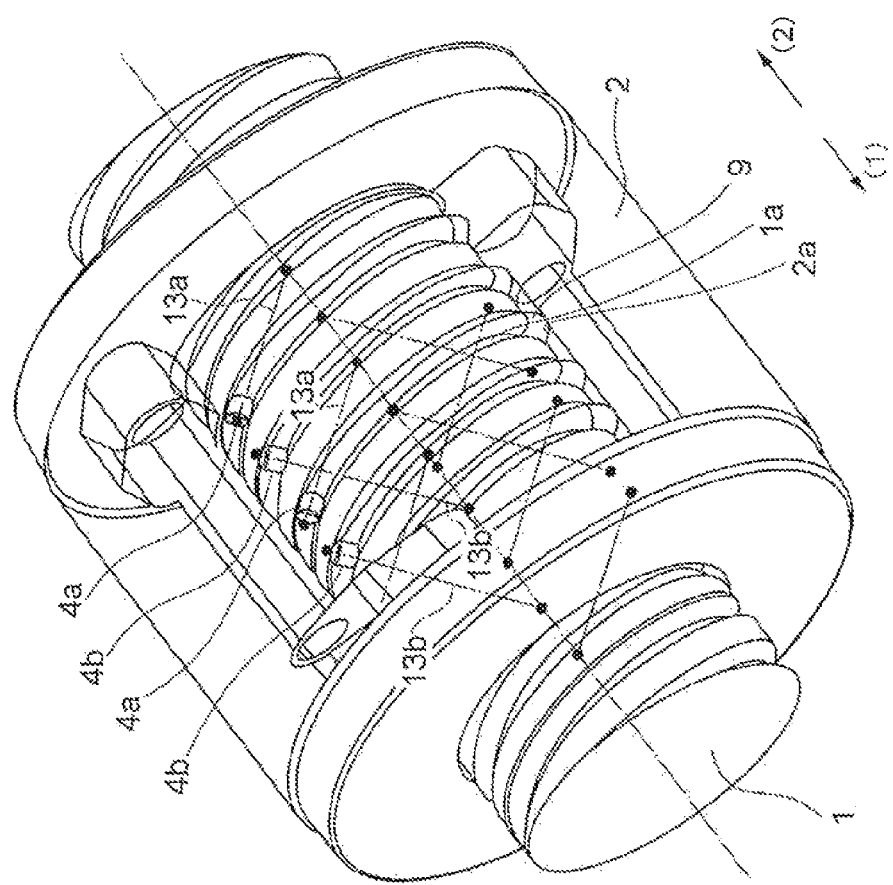
FIG. 3 is a perspective view of rollers arranged in a loaded roller rolling path.

FIG. 3 illustrates rollers 4a and 4b arranged in the loaded roller rolling path 9. In this figure, the nut 2 is transparent so as to see the rollers 4a and 4b arranged in the loaded roller rolling path. The roller screw is a two-thread screw. That is, there are two treads of the spiral roller rolling groove 1a formed on the outer peripheral surface of the screw shaft 1 and also, there are two threads of the spiral loaded roller rolling groove 2a formed on the inner peripheral surface of the nut 2. Correspondingly, there are two sets of the circulation members 7 and 8 mounted on the nut 2.

In one thread of the two-thread loaded roller rolling path 9, there are arranged rollers 4a that can bear a load in one axial direction (1) of the screw shaft 1. In this loaded roller rolling path 9, the plural rollers 4a are parallel-arranged in such a manner that the axis lines of the adjacent rollers 4a are held substantially in parallel with each other. In FIG. 3, only one roller 4a is shown for each turn, however, actually the loaded roller rolling path is filled with the plural rollers 4a. The other thread of the loaded roller rolling path 9 has arranged therein rollers 4b that can bear a load in the axially opposite direction of the screw shaft 1. In this loaded roller rolling path 9, the plural rollers 4b are parallel-arranged in such a manner that the axis lines of the adjacent rollers 4b are held substantially in parallel with each other.

Here, in this embodiment, the roller screw is a two-thread screw so that it can bear loads of both directions along the axial direction of the screw shaft. However, the roller screw may be a one-thread screw if it has only to bear a load of a single direction along the axial direction of the screw shaft. Otherwise, the roller screw may be a three-thread screw or the like.

As illustrated in FIG. 3, in the loaded roller rolling path, the central axes 13a and 13b of the rollers 4a and 4b pass through the axis line of the screw shaft 1. No matter where the rollers 4a and 4b are positioned around the screw shaft 1, the central axes 13a and 13b of the rollers 4a and 4b pass through the axis line of the screw shaft 1. This structure makes it possible to prevent the rollers 4a and 4b from being inclined and skewed when moving in the loaded roller rolling path 9. As the rollers 4a and 4b are arranged in the loaded roller rolling path 9 keeping such attitudes, to be exact, the rollers 4a are not arranged in parallel with each other, nor the rollers 4b. However, as every adjacent rollers 4a, or adjacent rollers 4b, have their axis lines approximately in parallel with each other, their axis lines are said to be substantially parallel with each other.

Figure 4:
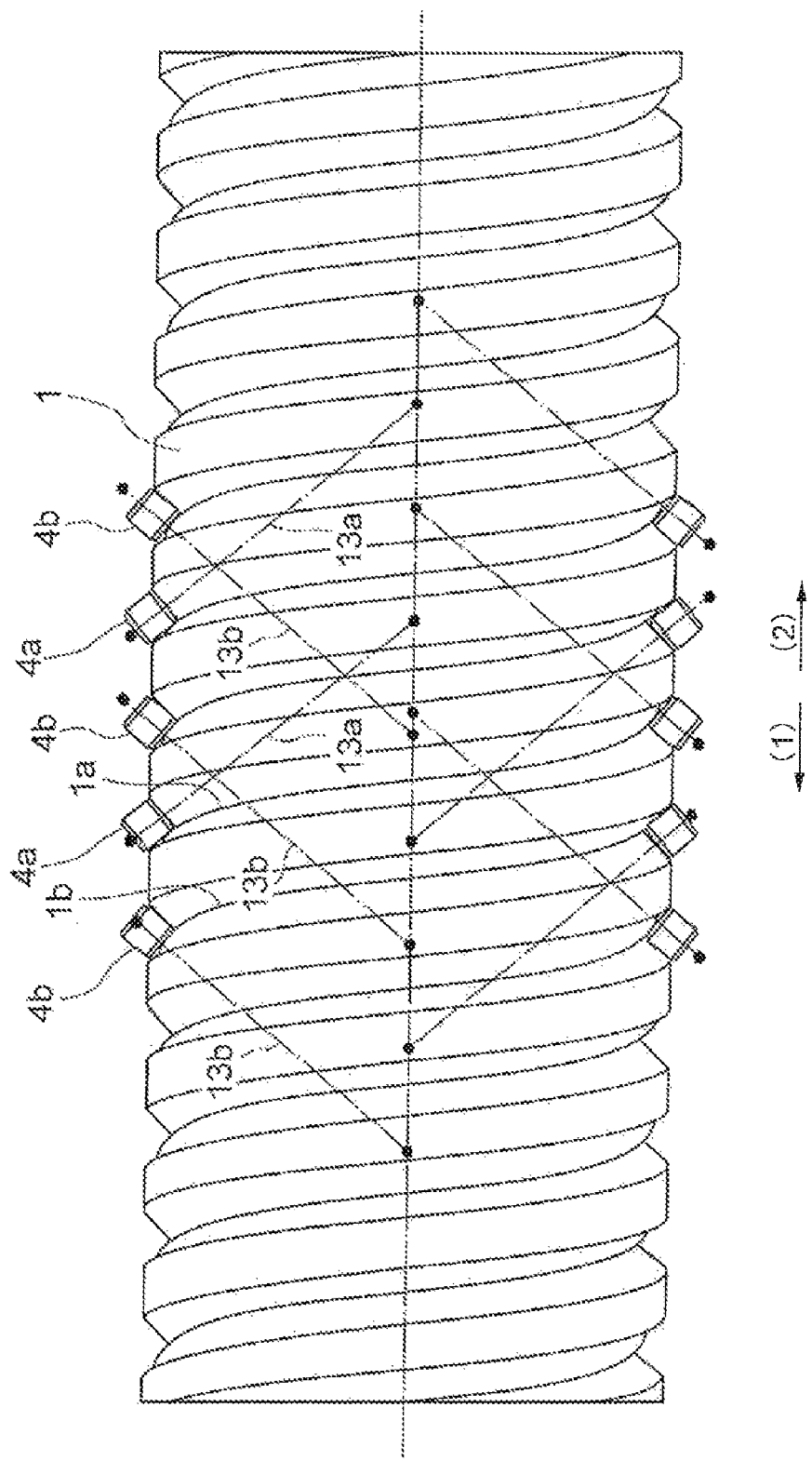
FIG. 4 is a lateral view of a screw shaft.

FIG. 4 illustrates the screw shaft 1. On the outer peripheral surface of the screw shaft 1, two threads of spiral roller rolling groove 1a are formed having a predetermined lead and an almost V shaped cross section. The rollers 4a that can bear a load in one axial direction of the screw shaft 1 (1) are parallel-arranged in the one-thread roller rolling groove 1a and the rollers 4b that can bear a load in the axially opposite direction of the screw shaft 1 (2) are parallel-arranged in the other-thread roller rolling groove 1a.

Figure 5:
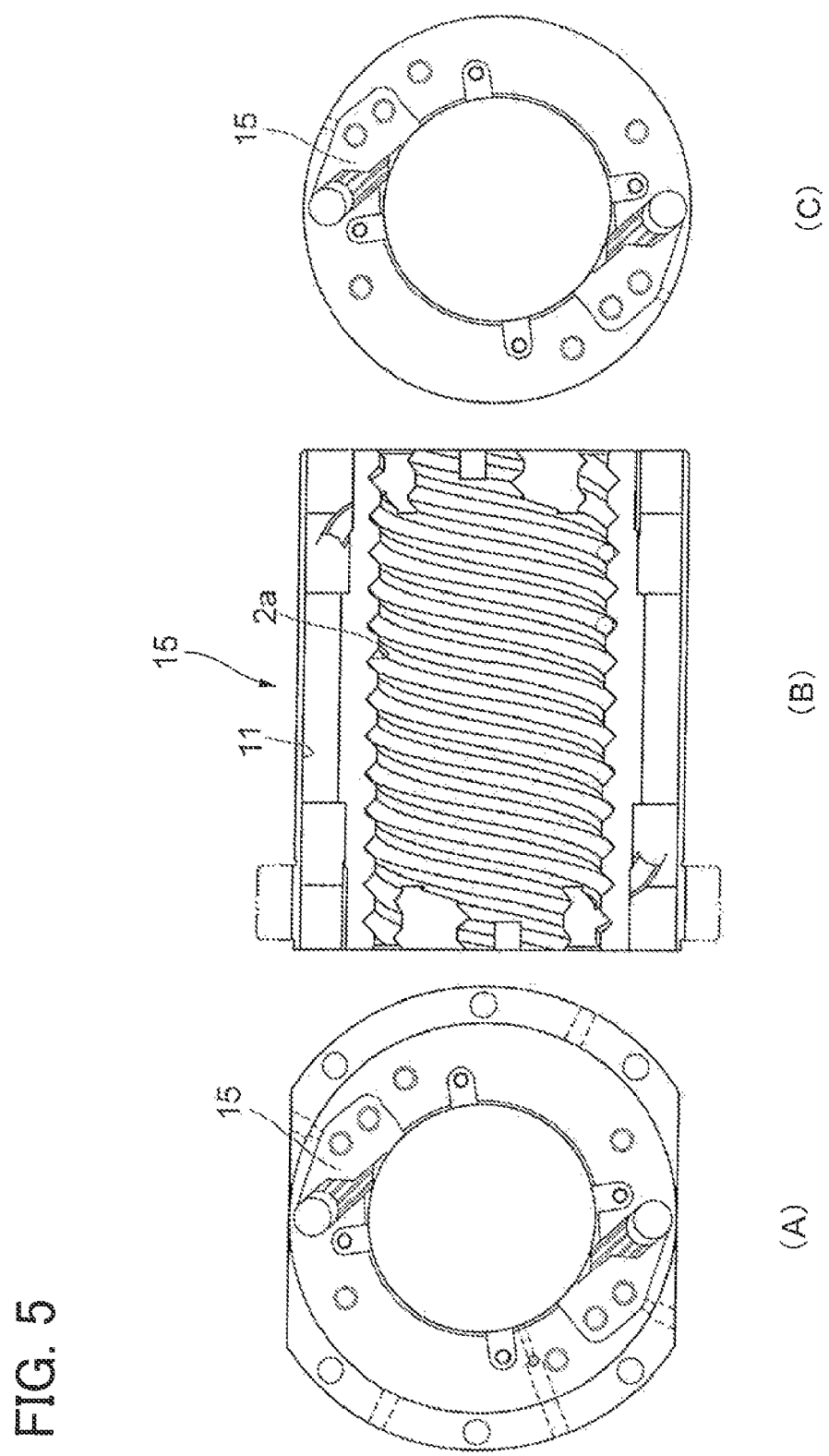
FIGS. 5(A) to 5(C) are views illustrating a nut (FIG. 5(A) is a front view, FIG. 5(B) is a cross sectional view and FIG. 5(C) is a back view).

FIGS. 5(A) to 5(C) illustrate the nut 2. In the nut 2, two threads of spiral loaded roller rolling groove 2a are formed facing the roller rolling groove 1a of the screw shaft 1, having the predetermined lead and having an almost V-shaped cross section. In the nut 2, the through hole 11 is formed for insertion of the straight path component 7 into the nut 2. At each end surface of the nut 2, recesses 15 are formed for mounting the direction change path components 8 onto the nut 2. In this embodiment, as the roller screw is a two-thread screw, two sets of the circulation members 7 and 8 are mounted on the nut.

Figure 6:
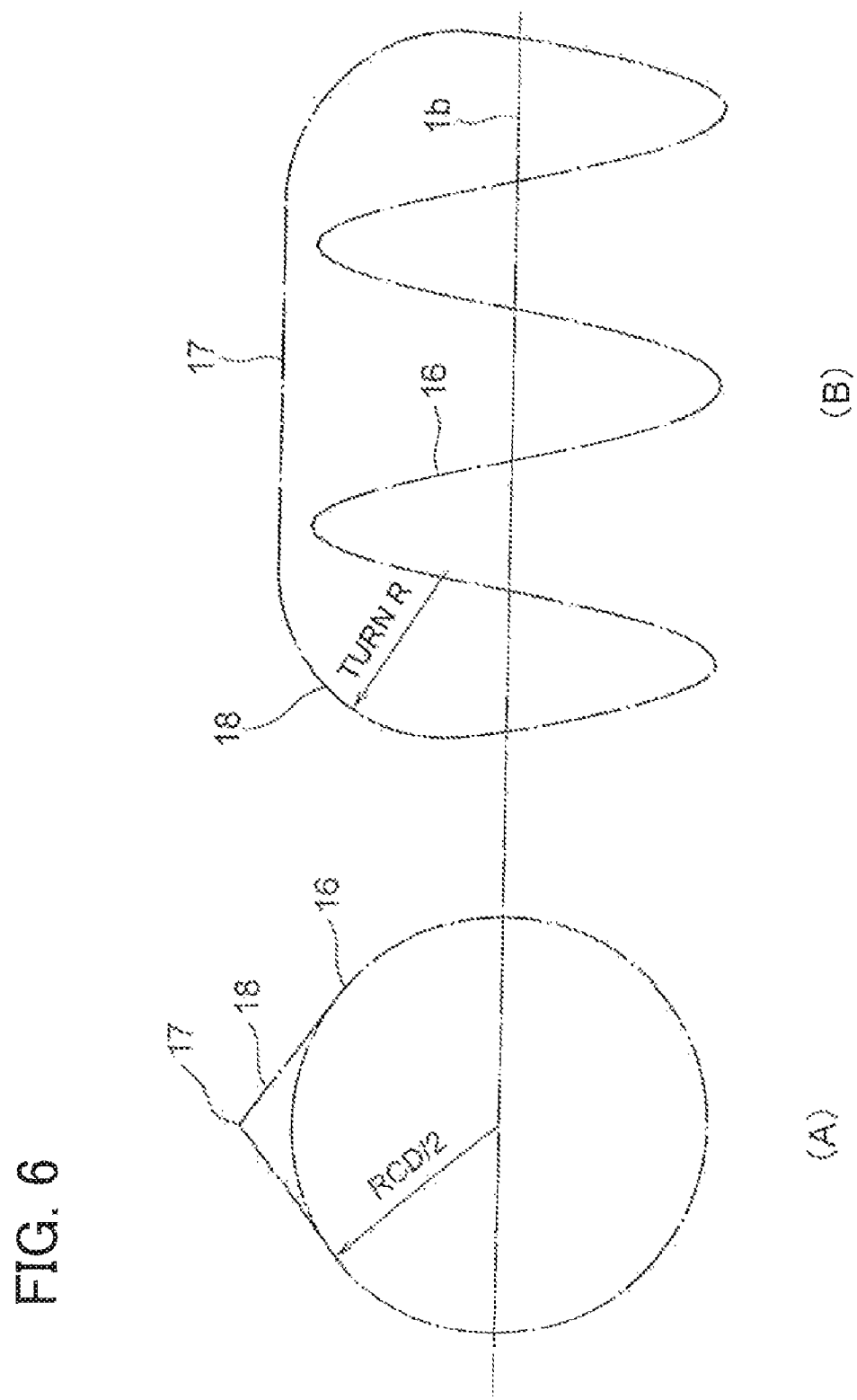
FIGS. 6(A) and 6(B) are views each illustrating a moving track of the center point of the roller (FIG. 6(A) shows the moving track seen in the axial direction of the screw shaft and FIG. 6(B) shows the moving track seen from the side of the screw shaft).

FIGS. 6(A) and 6(B) illustrate the moving track of the center point of each roller moving in the one-thread loaded roller rolling path and unloaded roller return path. FIG. 6(A) illustrates the moving track seen in the axial direction of the screw shaft 1 while FIG. 6(B) illustrates the moving track seen from the side of the screw shaft 1. In the loaded roller rolling path 9, the moving track 16 of the center point of the roller 4 becomes a shape obtained by incorporating the radius of the roller 4 into the spiral roller rolling groove 1a of the screw shaft 1 or the loaded roller rolling groove 2a of the nut 2. Accordingly, the moving track 16 becomes a circle having a radius of RCD/2 when seen in the axial direction of the screw shaft 1 and becomes spiral when seen from the side of the screw shaft 1.

Once the spiral moving track 16 of the center point of the roller 4 in the loaded roller rolling path 9 is grasped, each end of the moving track 16 of the center point are extended in its tangential direction. In the straight path 10a of the unloaded roller return path 10, the moving track 17 of the center point of the roller 4 becomes a straight line in parallel with the center line 1b of the screw shaft 1. Then, the moving track 16 extended in the tangential direction and the moving track 17 of the straight path 10a are connected via an arc having a curvature radius of R, for example, thereby to obtain a moving track 18 of the center point of the roller 4 in the direction change path 10b. Thus, the moving tracks 17 and 18 of the center point of the roller 4 in the unloaded roller return path 10 are designed to be line shape.

Figure 7:
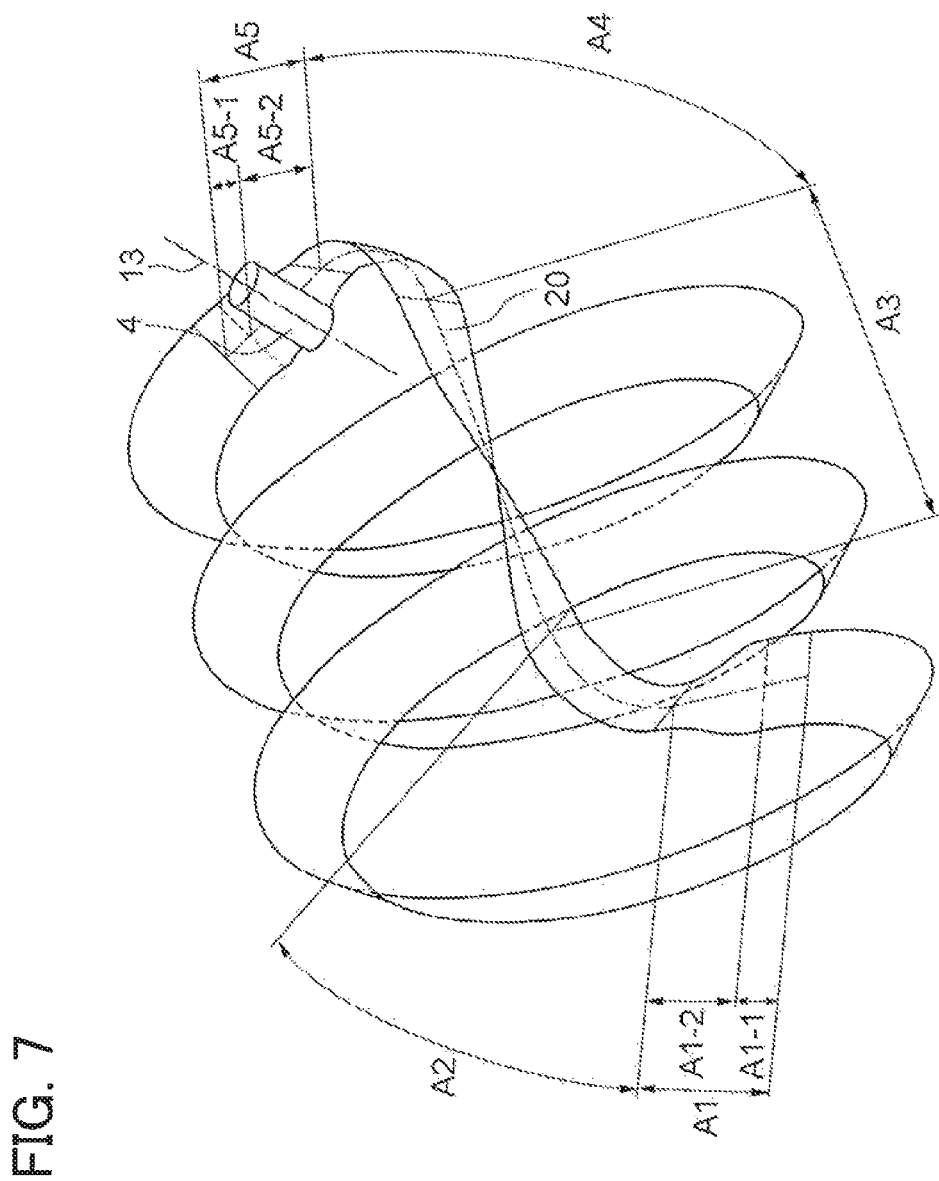
FIG. 7 is a view illustrating the moving track of the central axis of the roller.

As illustrated in FIG. 7, a moving track 20 of the central axis 13 of the roller 4 is designed to a band-like surface shape by moving the central axis 13 of the roller 4 along the line-shaped moving tracks 16 to 18 of the center point. In this figure, A1 and A5 show areas of respective end parts of the unloaded roller return path 10, A2 and A4 show areas of the direction change paths 10b and A3 shows an area of the straight path 10a. In order to move the roller smoothly from the unloaded roller return path 10 to the loaded roller rolling path 9, the attitude of the roller 4 at each end part of the unloaded roller return path 10 needs to be matched to the attitude of the roller 4 in the loaded roller rolling path 9. In addition, when the rollers 4 are parallel-arranged, the rollers 4 have to be returned to the loaded roller rolling path 9 without being turned around. In order to meet these needs, at least one longitudinal part of the unloaded roller return path 10 is twisted so as to incline the central axis of each of the rollers 4 when the rollers 4 move in the unloaded roller return path 10. In this embodiment, the straight path 10a is twisted, and the central axis of the roller 4 at the exit of the straight path 10a is inclined about 90 degrees with respect to the central axis of the roller 4 at the entrance of the straight path 10a. Hence, in the area A3 of the straight path 10a, the moving track 20 of the central axis of the roller 4 has a twisted band-like surface shape. This twisting rate of the straight path 10a (the ratio of the moving distance of the roller 4 to the inclination angle of the central axis of the roller 4) is kept constant.

In the areas A2 and A4 of the direction change paths 10b, the moving track 20 of the central axis of the roller 4 is not twisted. If it is twisted, when the roller 4 is moved along the circular arc-shaped raceway, the central axis of the roller 4 is inclined and the roller 4 cannot move smoothly. In order to prevent such unsmooth movement of the roller 4, the moving track 20 is not twisted. In each direction change path 10b, the moving track 20 has a shape of band bent along the arc.

Also in the areas A1-1 and A5-1 where the respective end parts of the unloaded roller return path 10 are connected to the loaded roller rolling path 9, the moving track of the central axis of the roller 4 is not twisted. In these areas A1-1 and A5-l, both end parts of the unloaded roller return path 10 operate to move the roller along the straight raceway with its attitude maintained. Meanwhile, in the areas A1-2 and A5-2 of the parts connected to the direction change paths 10b, the moving track 20 of the central axis of the roller 4 is twisted so that these parts are connected to the direction change paths 10b. In the areas A1-2 and A5-2, the moving track 20 of the central axis of the roller 4 has a shape of twisted band-like surface shape.

The areas A1 to A5 described up to this point are areas of the unloaded roller return path 10. The unloaded roller return path 10 is formed in the circulation members 7 and 8 mounted on the nut 2. In this unloaded roller return path 10, there is small clearance around each roller 4 and the roller 4 is moved pushed by its following roller 4. Meanwhile, the area other than the areas A1 to A5 is an area of the loaded roller rolling path 9. In this area, the roller 4 bears load between the roller rolling groove 1a of the screw shaft 1 and the loaded roller rolling groove 2a of the nut 2. As the screw shaft 1 rotates relative to the nut 2, the roller 4 rolls and moves spirally.

To be exact, at an end of the loaded roller rolling path 9, the loaded roller rolling groove 2a of the nut 2 may be provided with crowning so that each roller 4 can smoothly move from the loaded roller rolling path 9 to the unloaded roller return path 10 and vice versa. If crowing is formed, when the roller 4 moves from the loaded roller rolling path 9 to the unloaded roller return path, the load applied to the roller 4 at the end of the loaded roller rolling path 9 becomes released gradually and sometimes the roller 4 comes not to bear the load finally. In this embodiment, the part where such crowning is formed is also called loaded roller rolling path 9.

Figure 8:
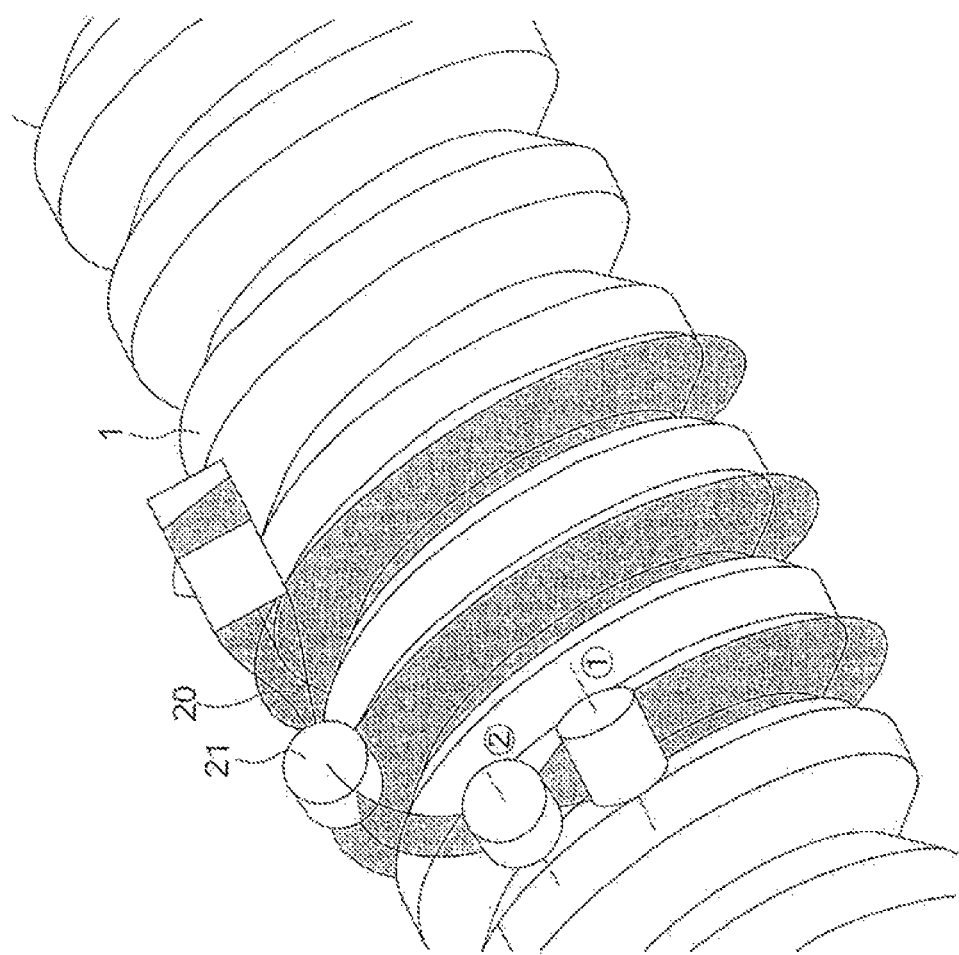
FIG. 8 is a view illustrating a virtual roller moving along the moving track.
Figure 9:
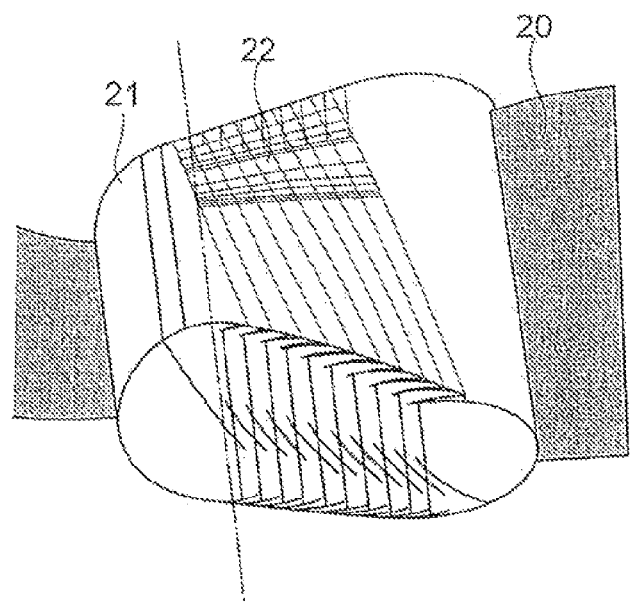
FIG. 9 is a view illustrating an assembly of virtual roller moving positions.
Figure 10:
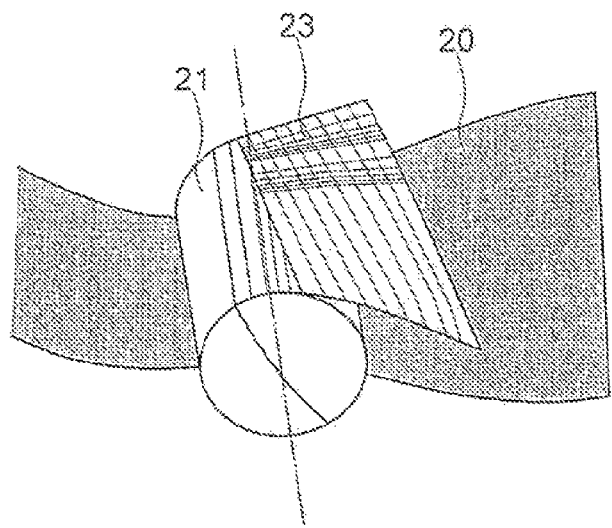
FIG. 10 is a view illustrating a wall surface of a designed unloaded roller return path.

Next, as illustrated in FIG. 8, a virtual roller 21 is moved along the moving track 20 of band-like surface shape to design the unloaded roller return path 10. Used here is the virtual roller 21 which has slightly larger diameter and height than those of an actually used roller 4. Then, the virtual roller 21 is moved along the moving track 20 (more specifically, the virtual roller 21 is moved little by little in such a manner that the central axis of the virtual roller 21 is orthogonal to the line-shaped moving tracks 17 and 18 and the central axis of the virtual roller 21 is positioned in the band-like surface) When the virtual roller 21 is moved (for example, from (1) to (2)), it can be seen that the central axis of the virtual roller 21 is inclined. FIG. 9 shows an assembly of positions of the virtual roller 21 which is moved little by little. As seen from FIG. 9, the virtual roller 21 having a volume is moved to obtain a swept curved surface 22. Then, as shown in FIG. 10, the sweep curved surface 22 of FIG. 9 is used to create a wall surface 23 of the unloaded roller return path.

Figure 11:
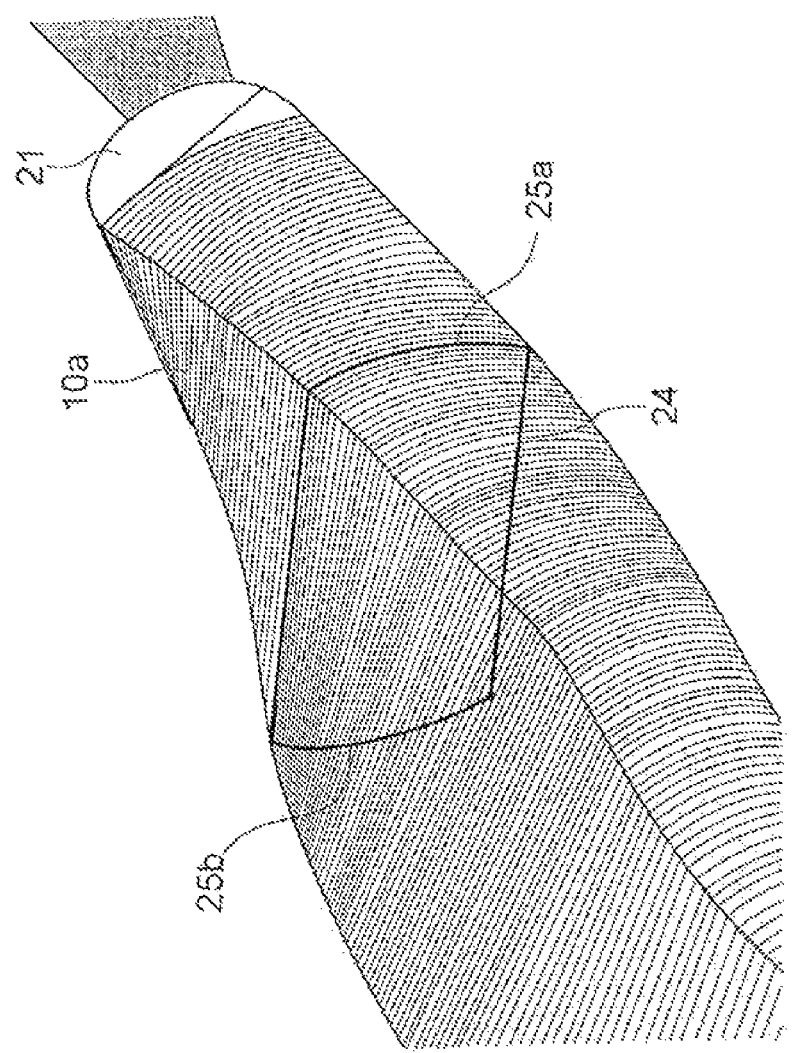
FIG. 11 is a view illustrating a straight path of a designed unloaded roller return path.
Figure 12:
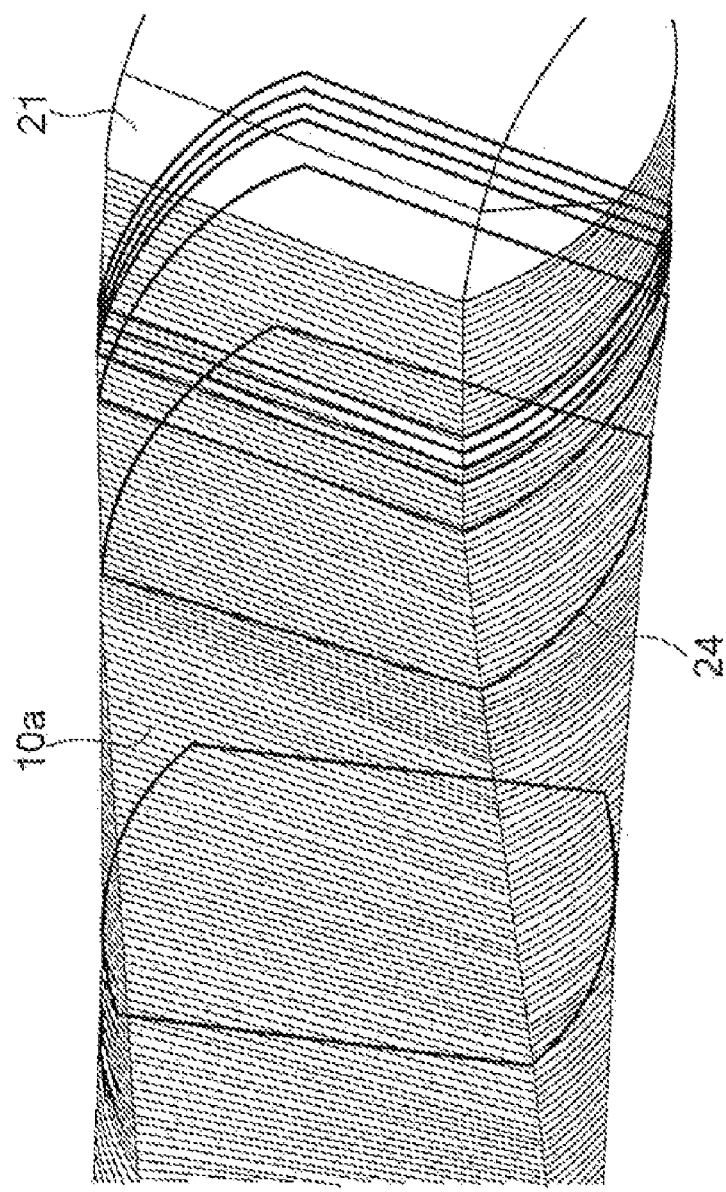
FIG. 12 is a view illustrating the straight path of the designed unloaded roller return path.

FIGS. 11 and 12 illustrate the straight path 10a of the unloaded roller return path 10 designed by the above-described designing method. When the straight path 10a is taken cross-sectionally (more specifically, the cross section in a plane orthogonal to the line-shaped moving track 17 of the central point of the roller 4), the cross sectional shape 24 is not quadrangular but a specific shape like a drum.

Figure 13:
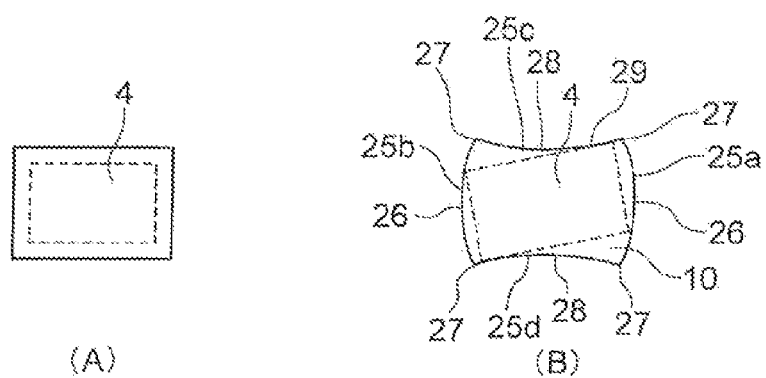
FIGS. 13(A) and 13(B) are views each illustrating a cross sectional shape of the unloaded roller return path (FIG. 13(A) illustrates an example of a rectangular cross section, and FIG. 13(B) illustrates an example of an odd-quadrangle-shaped cross section).

FIGS. 13(A) and 13(B) show comparison of the cross sectional shape of a conventional unloaded roller return path with that of the straight path 10a of the unloaded roller return path 10 of this embodiment. The cross sectional shape of the conventional unloaded roller return path is, as shown in FIG. 13(A), a quadrangle similar to the cross sectional shape of the roller 4 taken along the central axis of the roller 4, and for example, a rectangle. On the other hand, the cross sectional shape of the straight path 10a of the unloaded roller return path 10 of the present embodiment has two side surface corresponding parts 25c, 25d facing respective side surfaces of the roller 4, and each of the side surface corresponding parts 25c, 25d is convex toward the inside of the unloaded roller return path 10. More specifically, respective center parts 28 of the side surface corresponding parts 25c and 25d are most dented and the dent becomes gradually smaller from the center part 28 to the both end parts 27 (left and right ends in the figure). In addition, each of paired end surface corresponding parts 25a and 25b facing the respective end surfaces of the roller 4 is formed convex toward the outside of the unloaded roller return path 10. More specifically, respective center parts 26 of the end surface corresponding parts 25a and 25b are most bulged and the bulges becomes smaller gradually from the center part 26 to the both end parts 27 (upper and lower ends in the figure). The convex shape of the end surface corresponding parts 25a and 25b and side surface corresponding parts 25c and 25d may consist of only a curve or of a polygon which is combination of plural line segments.

Figure 14:
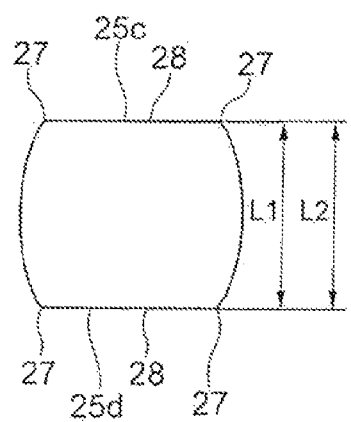
FIG. 14 is a view illustrating a cross section of the unloaded roller return path.

As shown in FIG. 14, actually each recess of the center parts 28 of the side surface corresponding parts 25c and 25d are very small, and the distance L1 between the center parts 28 of the side surface corresponding parts 25c and 25d only slightly differs in a minimal way from the distance L2 between the end parts 27 of the side surface corresponding parts 25c and 25d.

The cross sectional shape of each end part of the unloaded roller return path 10 (areas A1-1 to A5-1 connected to the loaded roller rolling path 9) is formed like a quadrangle similar to the cross sectional shape of the roller 4 taken along the central axis thereof. The cross sectional shape of the loaded roller rolling path 9 is a quadrangle identical to the cross sectional shape of the roller 4 taken along the central axis thereof. The cross sectional shape of each end part of the unloaded roller return path 10 is approximated to the cross sectional shape of the loaded roller rolling path 9 thereby to enable smooth movement of the roller 4 from the unloaded roller return path 10 to the loaded roller rolling path 9.

Figure 15:
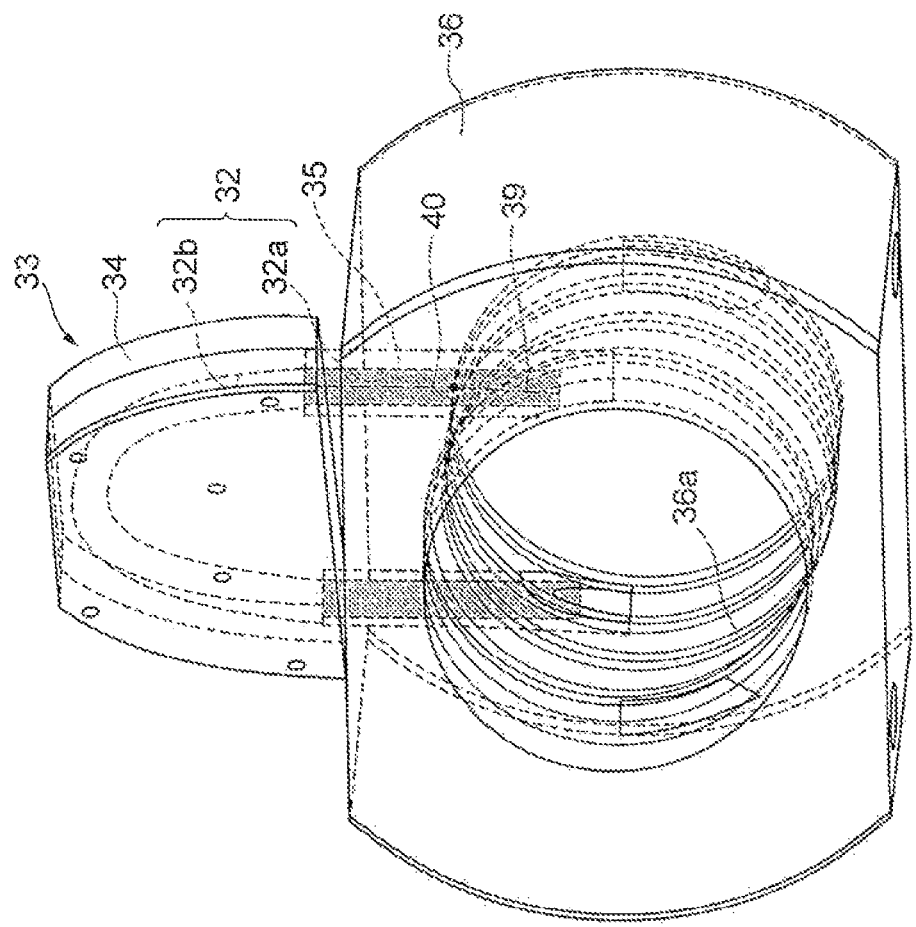
FIG. 15 is a view illustrating a nut of a roller screw according to a second embodiment of the present invention.

FIG. 15 shows a nut of a roller screw according to a second embodiment of the present invention. In this embodiment, the roller screw is a return-pipe type roller screw, instead of a so-called endcap type roller screw. The present invention is also applicable to the return-pipe type roller screw.

In the return-pipe type roller screw, an unloaded roller return path 32 is formed inside a return pipe 33. The return pipe 33 has a main body 34 where a direction change path 32b of the unloaded roller return path 32 is formed and a pair of leg parts 35 in each of which a straight path 32a is formed. The roller screw is a two-thread screw like the roller screw of the above-described first embodiment. The return pipe 33 is mounted on each of upper end and lower end of the nut 36. However, the return pipe mounted on the lower end is omitted here.

The direction change path 32b acts only to move each roller along the circular-arc shaped raceway and it is not twisted. In the direction change path 32b, the central axis of the roller always extends in the horizontal direction. The cross sectional shape of the direction change path 32b is formed like a quadrangle similar to the cross sectional shape of the roller taken along the central axis of the roller.

Meanwhile, the straight path 32a at each of the leg parts 35 is twisted. In order that the roller passes through the unloaded roller return path 32 and is returned to the loaded roller rolling path without being turned around (without changing the direction of the load the roller bears), the twisting angle of the paired legs 35 needs to be totally 90 degrees. One of the leg parts 35 is twisted about 10 degrees so as to match the attitude of the roller inside the loaded roller rolling groove 36a of the nut 36 to the attitude of the roller in the direction change path 32b. The other leg part 35 is twisted about 80 degrees so as to return the roller in the direction change path 32b to the loaded roller rolling groove 36a of the nut 36 without turning the roller around.

Figure 16:
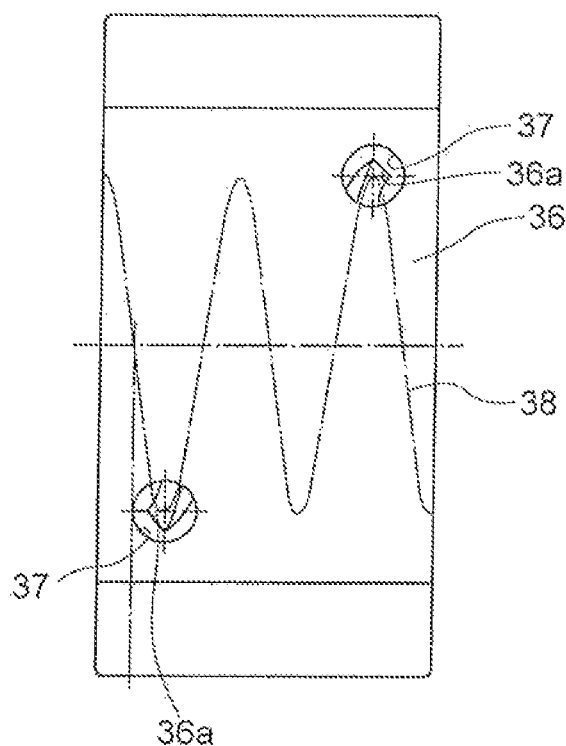
FIG. 16 is a plane view of the nut.
Figure 17:
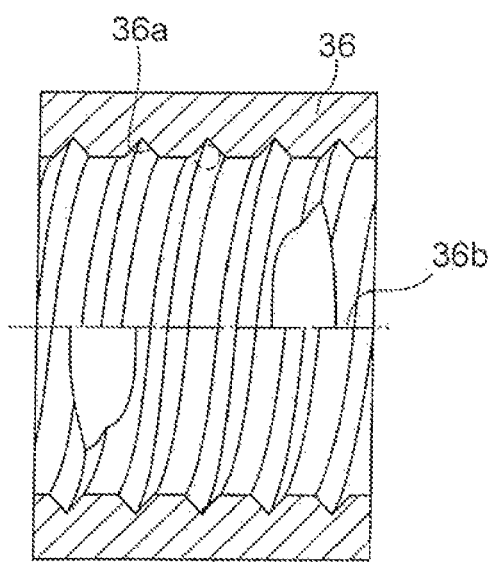
FIG. 17 is a cross sectional view of the nut.
Figure 18:
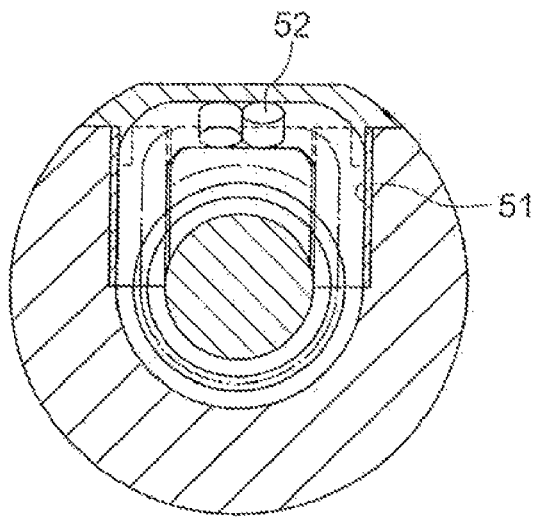
FIG. 18 is a cross sectional view of a conventional roller screw.
Figure 19:
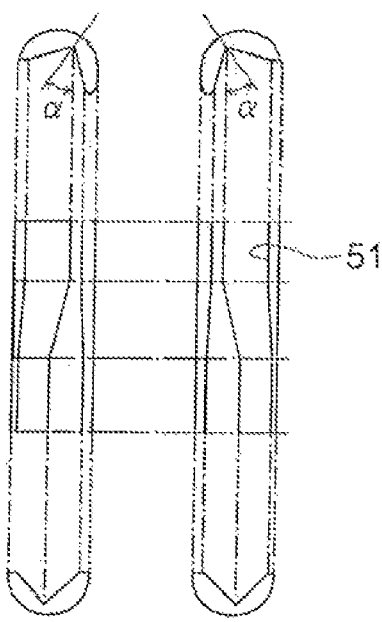
FIG. 19 is a view illustrating a twisted unloaded roller return path of the conventional roller screw.
Figure 20:
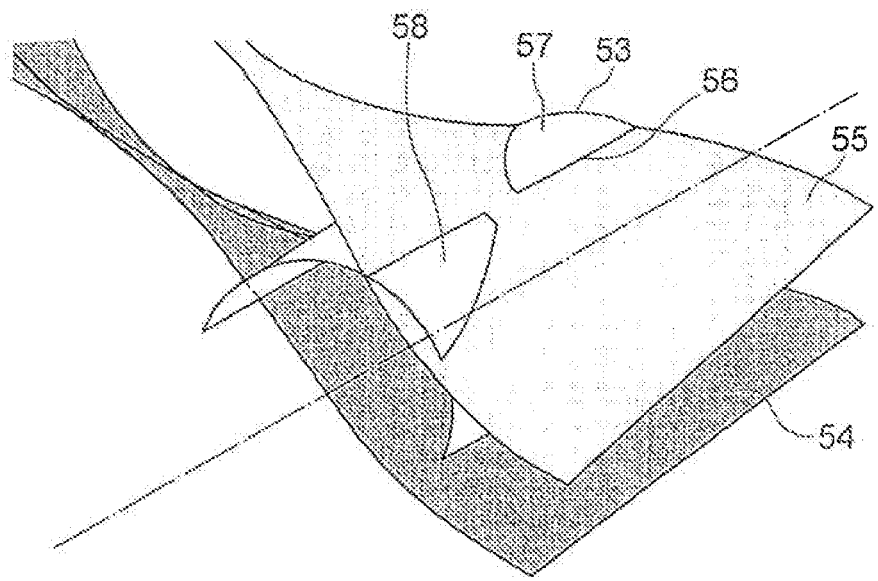
FIG. 20 is a view illustrating interference of the unloaded roller return path with the roller.

FIG. 16 is a plane view of the nut and FIG. 17 is a cross sectional view of the nut. The nut 36 has a pair of through holes 37 extending to the loaded roller rolling groove 36a. In these paired through holes 37, the paired leg parts 35 of the return pipe 33 are inserted. In the return-pipe type ball screw, each end of the loaded roller rolling groove 36a of the nut 36 ends in the horizontal plane in parallel with the center line 36b of the nut 36.

The unloaded roller return path 32 is designed in the following way, just as with the unloaded roller return path of the endcap type roller screw. First, each end of a spiral moving track 38 of the center point of the roller in the loaded roller rolling path is extended in its tangential direction. Then, this moving track 39 extended in the tangential direction and an arc-shaped moving track of the center point of the roller in the direction change path 32b are connected via a vertical line 40 (see FIG. 15). Preferably, the moving track 39 extended in the tangential direction is directly linked to the moving track of the direction change path 32b. If the moving track 39 is extended in the tangential direction and juts out of the leg part 35, the vertical line 40 is provided.

Then, the central axis of the roller is moved along the line-shaped moving tracks 39 and 40, the moving track of the central axis of the roller is formed into a band-like surface, and the moving track of band-like surface shape is twisted in the leg part 35. Then, the roller is moved along the moving track of band-like surface shape to design the unloaded roller return path 32. Of the designed unloaded roller return path, the twisted straight path has a cross sectional shape of irregular quadrangle as shown in FIG. 13(B). The non-twisted direction change path 32b and both end parts thereof have cross sectional shapes of quadrangle similar to the cross sectional shape of the roller as shown in FIG. 13(A).

The present invention is not limited to the above-described embodiments and may be embodied in various forms without departing from the scope of the present invention. For example, the roller may not be a cylindrical roller but a conical tapered roller.

The present specification is based on Japanese Patent Applications No. 2006-126613 filed on Apr. 28, 2006, the entire contents of which are expressly incorporated by reference herein.

The invention claimed is:

1. A roller screw, comprising:
   a screw shaft having an outer peripheral surface with a roller rolling part spirally formed thereon;
   a nut having an inner peripheral surface with a loaded roller rolling part spirally formed thereon facing the roller rolling part, and having an unloaded roller return path connecting one end of the loaded roller rolling part with an opposite end thereof; and
   a plurality of rollers parallel-arranged in a roller circulation path having the unloaded roller return path and a loaded roller rolling path between the roller rolling part and the loaded roller rolling part in such a manner that axis lines of adjacent two of the rollers are held substantially in parallel with each other,
   wherein the unloaded roller return path has, in a longitudinal direction thereof, at least a twisted part which is twisted such that a central axis of each of the rollers is inclined when the roller moves in the unloaded roller return path, and
   wherein the twisted part of the unloaded roller return path has a cross section in which each paired side surface corresponding part facing a respective side surface of the roller is convex toward an inside of the unloaded roller return path.

2. A roller screw, comprising:
   a screw shaft having an outer peripheral surface with a roller rolling part spirally formed thereon;
   a nut having an inner peripheral surface with a loaded roller rolling part spirally formed thereon facing the roller rolling part, and having an unloaded roller return path connecting one end of the loaded roller rolling part with an opposite end thereof; and
   a plurality of rollers parallel-arranged in a roller circulation path having the unloaded roller return path and a loaded roller rolling path between the roller rolling part and the loaded roller rolling part in such a manner that axis lines of adjacent two of the rollers are held substantially in parallel with each other,
   wherein each of the rollers has a substantially quadrangular cross section taken along the axis line of the roller,
   wherein the unloaded roller return path has, in a longitudinal direction thereof, at least a twisted part which is twisted such that a central axis of each of the rollers is inclined when the roller moves in the unloaded roller return path, and
   wherein the twisted part of the unloaded roller return path has a cross section in which each paired end surface corresponding part facing a respective end surface of the roller is convex toward an outside of the unloaded roller return path.

3. A roller screw, comprising:
   a screw shaft having an outer peripheral surface with a roller rolling part spirally formed thereon;
   a nut having an inner peripheral surface with a loaded roller rolling part spirally formed thereon facing the roller rolling part, and having an unloaded roller return path connecting one end of the loaded roller rolling part with an opposite end thereof; and
   a plurality of rollers parallel-arranged in a roller circulation path having the unloaded roller return path and a loaded roller rolling path between the roller rolling part and the loaded roller rolling part in such a manner that axis lines of adjacent two of the rollers are held substantially in parallel with each other,
   wherein the unloaded roller return path has, in a longitudinal direction thereof, at least a twisted part which is twisted such that a central axis of each of the rollers is inclined when the roller moves in the unloaded roller return path,
   wherein the twisted part of the unloaded roller return path has a cross section in which each of paired side surface corresponding part facing a respective side surface of the roller is convex toward an inside of the unloaded roller return path, and in which each paired end surface corresponding part facing a respective end surface of the roller is convex toward an outside of the unloaded roller return path.

4. The roller screw according to any one of claims 1 to 3, wherein a cross sectional shape of each end part of the unloaded roller return path connected to the loaded roller rolling path is a quadrangle similar to a cross sectional shape of the roller taken along the central axis thereof.

5. The roller screw according to claim 4, wherein the each end part of the unloaded roller return path acts to move the roller along a straight raceway with an attitude of the roller kept fixed.

6. The roller screw according to any one of claims 1 to 3, wherein the unloaded roller return path has a straight path which acts to move the roller along a straight raceway and a direction change path which acts to move the roller along a curved raceway, the straight path of the unloaded roller return path is twisted in such a manner that the central axis of the roller is inclined when the roller moves in the straight path, and the direction change path of the unloaded roller return path is not twisted so that the central axis of the roller is not inclined when the roller moves in the direction change path.

* * * * *